US009025934B2

(12) United States Patent
Yoshimoto et al.

(10) Patent No.: US 9,025,934 B2
(45) Date of Patent: May 5, 2015

(54) DISC PLAYER DEVICE

(75) Inventors: Takashi Yoshimoto, Kanagawa (JP); Yoshinori Hiramatsu, Kanagawa (JP)

(73) Assignee: Panasonic Intellectual Property Management Co., Ltd. (JP)

( * ) Notice: Subject to any disclaimer, the term of this patent is extended or adjusted under 35 U.S.C. 154(b) by 277 days.

(21) Appl. No.: 13/817,856

(22) PCT Filed: Feb. 29, 2012

(86) PCT No.: PCT/JP2012/001365
§ 371 (c)(1),
(2), (4) Date: Feb. 20, 2013

(87) PCT Pub. No.: WO2012/127787
PCT Pub. Date: Sep. 27, 2012

(65) Prior Publication Data
US 2013/0156401 A1     Jun. 20, 2013

(30) Foreign Application Priority Data

Mar. 22, 2011  (JP) ................. 2011-062894

(51) Int. Cl.
*H04N 9/80* (2006.01)
*H04N 5/93* (2006.01)
(Continued)

(52) U.S. Cl.
CPC .......... *H04N 9/87* (2013.01); *H04N 21/42646* (2013.01); *H04N 21/4325* (2013.01); *H04N 21/4432* (2013.01); *G11B 20/10* (2013.01);
(Continued)

(58) Field of Classification Search
USPC ................... 386/239–248, 353–357
See application file for complete search history.

(56) References Cited

U.S. PATENT DOCUMENTS 5,999,694 A * 12/1999 Yasuda et al. ............... 386/349
2005/0196143 A1    9/2005 Kato et al.
(Continued)

FOREIGN PATENT DOCUMENTS

JP      2009-176411 A      8/2009
JP      2009-193642 A      8/2009
(Continued)

OTHER PUBLICATIONS

International Search Report for Application No. PCT/JP2012/001365, dated May 1, 2012, 2 pages.
(Continued)

*Primary Examiner* — Hung Dang
(74) *Attorney, Agent, or Firm* — RatnerPrestia (57) ABSTRACT

When a disc player device (100) is powered on again, playback information stored in a nonvolatile storage portion (160) is retrieved by a playback information retrieving portion (170) and delivered to a user operation auto-executing portion (180). It is determined whether or not user input instructions are limited, on the basis of user operation mask information obtained by a user operation mask information obtaining portion (130). An information comparing portion (182) compares playlist information, and an information comparing portion (184) compares play item information. Finally, a title including playlist information and play item information last stored in the nonvolatile storage portion (160) before the power-on of the disc player device (100) is searched for, and normal playback of the title is started. Such a configuration allows for quick playback resuming of a BD-J title being played at the time of the power-off, with a Java application running.

7 Claims, 4 Drawing Sheets

(51) Int. Cl.
*H04N 9/87* (2006.01)
*H04N 21/426* (2011.01)
*H04N 21/432* (2011.01)
*H04N 21/443* (2011.01)
*G11B 20/10* (2006.01)
*G11B 19/04* (2006.01)
*H04N 21/845* (2011.01)
*G11B 27/10* (2006.01)
*H04N 5/85* (2006.01)
*H04N 9/804* (2006.01)

(52) U.S. Cl.
CPC .... *G11B 19/047* (2013.01); *G11B 2020/10972* (2013.01); *G11B 2220/2541* (2013.01); *H04N 5/85* (2013.01); *H04N 9/8042* (2013.01); *H04N 21/8455* (2013.01); *G11B 27/105* (2013.01)

(56) References Cited

U.S. PATENT DOCUMENTS

| | | | |
|---|---|---|---|
| 2006/0206819 A1* | 9/2006 | Tsuji et al. | 715/716 |
| 2007/0003220 A1* | 1/2007 | Hamasaka et al. | 386/95 |
| 2008/0008448 A1* | 1/2008 | Kang et al. | 386/95 |
| 2009/0010437 A1* | 1/2009 | Takashima et al. | 380/277 |
| 2010/0008653 A1 | 1/2010 | Iwasaki et al. | |
| 2010/0094880 A1* | 4/2010 | Rogers et al. | 707/752 |
| 2010/0189416 A1 | 7/2010 | Kawakami | |
| 2011/0032327 A1* | 2/2011 | Ikeda et al. | 348/42 |
| 2011/0122740 A1 | 5/2011 | Kawakami et al. | |
| 2011/0188833 A1 | 8/2011 | Kawato et al. | |
| 2011/0243527 A1* | 10/2011 | Hayashi | 386/241 |
| 2012/0033941 A1 | 2/2012 | Yahata et al. | |
| 2012/0134647 A1 | 5/2012 | Yoshimoto et al. | |

FOREIGN PATENT DOCUMENTS

| | | |
|---|---|---|
| JP | 2009-259356 A | 11/2009 |
| JP | 2010-033628 A | 2/2010 |
| JP | 2011-155559 A | 8/2011 |
| WO | WO 2009/128232 A1 | 10/2009 |
| WO | WO 2011/001661 A1 | 1/2011 |

OTHER PUBLICATIONS

Supplementary European Search Report for Application No. EP 12 75 9984 dated Oct. 16, 2014.

* cited by examiner

DISC PLAYER DEVICE

This application is a U.S. National Phase Application of PCT International Application PCT/JP2012/001365.

TECHNICAL FIELD

The present invention relates to a disc player device that reproduces data recorded in a recording medium such as a BD-ROM (Blu-ray-read-only-memory).

BACKGROUND ART

In recent years, optical disc player devices have become widely popular for general household use, and the devices provide high image and sound qualities, have highly interactive features, and replay optical discs in which large amounts of information are recorded.

Representative high-capacity optical discs include Blu-ray disc (BD; hereinafter, referred to as "BD"). BDs offer high data storage capacity; single layer discs contain 25 gigabytes (GB), and dual layer BDs contain 50 GB, so that data having the image quality of high-definition movie content can be stored in the BDs. Packaged software for purchase and rent that uses the BDs is provided in the read-only media, BD-ROMs, which are manufactured with data thereon and not writable and rewritable.

Two specifications of HDMV and BD-J modes are formulated for the BD-ROM. The HDMV mode has an extended video/audio codec specification compared with that in the conventional DVD-ROM. In the specification of the HDMV mode, a high-definition image and high-quality audio are available. Because a content specification is the same as that in the DVD-ROM and a method for controlling HDMV titles is an extension of that in the conventional DVD-ROM, if content information being played is stored, a playback resuming function for DVD-ROMs may be easily provided.

The BD-J mode, having the features of the HDMV mode, can add visual representations; for example, images may be superimposed on each other with a Java® application. Menu display and video playback of BD-J titles are controlled by a Java program on a BD-ROM, so that flexible processing is enabled as compared with HDMV titles. Thus, large amounts of information are required to be stored in order to include a playback resuming function, but such information storing is impracticable for a system incorporated in vehicles.

Now, an operation for playing a BD-ROM on a disc player device will be described.

A BD-ROM, such as packaged software, has a plurality of reproducible titles and is managed for each title. They include a title that is played after power-on and before a main part is reproduced and a menu is displayed. Hereinafter, this title will be referred to as the first play. First plays include presentation of other packaged software, a preview of a movie, or demonstration content of a sound field reproduction technology. Some packages have first plays, the reproduction time periods of which are as long as five minutes if the first plays are reproduced at a speed of 1x.

Also, in titles including a first play, the execution of the user operations may be limited by a user operation mask. The user operation mask refers to execution limitation of the user operations such as a button operation on a menu screen, menu moving, title skipping, playback stopping, chapter selecting, fast-forwarding, and fast-reversing, used by the user watching packaged software.

If the user operation mask is set, when the execution of masked user operations is attempted, a software module that deals with the user operations limits the execution thereof. The function allows for providing an operation intended by a content provider.

Thus, when a user desires to play main part video on a home Blu-ray Disc player device as soon as possible upon inserting a disc, if the user operation mask is not set in a first play, the user can reduce a first play time period by operating a remote control to execute the user operations such as menu moving, title skipping, and fast-forwarding.

Further, it has been proposed to, if a BD-ROM player device is used in an automobile, reproduce a digital stream recorded in a recording medium such as an optical disc by an operation without a GUI, like a CD player device (e.g., see Patent Literature 1).

However, in a large number of cases where disc player devices are used in automobiles, drivers are prohibited from operating their disc player devices while the vehicles are moving, so that a first play reproduction time period cannot be reduced by an operation using a remote control or a touch panel.

In particular, when the playing of a BD-J title is resumed after an engine stop or an instantaneous power interruption, impracticably, high-capacity memory is required to carry out continuation playing (playback resuming). For this reason, typically, in the foregoing cases, the content is played from the first play again. For example, if a user on a drive stops the engine to take a rest and restarts the engine after the rest, the same first play is reproduced for minutes every time, and then main part video is played.

In view of such circumstances, an optical disc device has been proposed which automatically shortens a first play in reproduction to allow for reducing a time that elapses before menu display or main part playback in an environment where the device is often powered on and off (Patent Literature 2).

CITATION LIST

Patent Literature

[Patent Literature 1] Japanese Patent Laid-Open No. 2009-176411

[Patent Literature 2] Japanese Patent Application No. 2010-545118

[Patent Literature 3] Japanese Patent Laid-Open No. 2010-33628

SUMMARY OF INVENTION

Technical Problem

Disc player devices for use in automobiles are relatively frequently powered on and off. For example, when a user is on a drive while playing BD-J content on such a device, the user often stops an engine to take a rest and thereafter starts the engine again. In such a case, a title being played until the engine stops is interrupted, but conventional common disc player devices force the user to watch the content from the start in the same manner as the user does just after the disc is inserted. The title being played until the engine stops cannot be quickly searched for and played.

It is noted that according to the technology disclosed in Patent Literature 3, simple resuming can be provided by changing the BD-J mode to the HDMV mode, thereafter playing content, but since the simple resuming is provided by not executing a Java program, features of the content are limited.

Also, according to the disc device disclosed in Patent Literature 2, a reproduction time period of a first play reproduced upon the power-on is shortened, but a time that elapses before the title being played at the time of the power-off is not shortened.

An object of the present invention, which has been made in view of such problems, is to provide a disc player device adapted to, if the disc player device is powered off during the playing of content of a BD-J title and the BD-J title playing is interrupted, carry out playback resuming, when the device is powered on again, without limiting features of the content of the BD-J title, that is, to quickly carry out the playback resuming of the BD-J title being played at the time of the power-off, with a Java application running.

Solution to Problem

In order to achieve the object, a disc player device according to the present invention includes: a signal reading portion that reads content information recorded in a disc; a playback portion that plays a title on the basis of the read content information; a user operation mask information obtaining portion that obtains user operation mask information from the content information; a playback information obtaining portion that obtains playlist information and play item information as playback information, which are assigned to a title being played by the playback portion; a nonvolatile storage portion in which the playback information is stored; a playback information writing portion that stores, in the nonvolatile storage portion, the playback information read by the playback information obtaining portion; a playback information retrieving portion that retrieves the playback information from the nonvolatile storage portion; and a user operation auto-executing portion that executes a user operation not being limited by the user operation mask information obtained by the user operation mask information obtaining portion.

Further, the user operation auto-executing portion includes: a playlist information comparing portion that compares the playlist information last stored in the nonvolatile storage portion before the disc player device is powered on, with playlist information on a title read by the signal reading portion after the disc player device is powered on; and a play item information comparing portion that, after a comparison process for the playlist information, compares the play item information last stored in the nonvolatile storage portion before the disc player device is powered on, with play item information on the title read by the signal reading portion after the disc player device is powered on.

In the user operation auto-executing portion having such a configuration, if there is one or more user operations, execution of which is not limited by the user operation mask information, the comparison process for the playlist information and the comparison process for the play item information automatically execute the user operation, the execution of which is not limited by the user operation mask information, and provide title searching at a speed higher than a normal speed of 1× until playlist information and play item information on a title currently being read by the signal reading portion match with the playlist information and the play item information stored in the nonvolatile storage portion before the disc player device is powered on.

Advantageous Effects of Invention

According to the present invention, it is allowed to provide a disc player device adapted to, if the disc player device is powered off during the playing of content of a BD-J title and the BD-J title playing is interrupted, carry out playback resuming quickly, when the device is powered on again, without limiting features of the content of the BD-J title.

Since the disc player device of the present invention executes the playback resuming after a confirmation of a user operation mask, a wish of a content provider is respected.

Also, even in the case where playback resuming by a Java program acts, since playlist information and play item information on a title started by the playback resuming are confirmed, a skipping process is never erroneously executed. Thus, the resuming function of the disc player device of the present invention can coexist with a resuming function of a Java program.

The disc player device of the present invention is particularly useful if BD-J titles, in which implementing a continuation playback (playback resuming) function is practically difficult, are played in an on-vehicle environment, where the device is often powered on and off.

DESCRIPTION OF EMBODIMENTS

Embodiments of the present invention will be described below with reference to the drawings.

Figure 1:
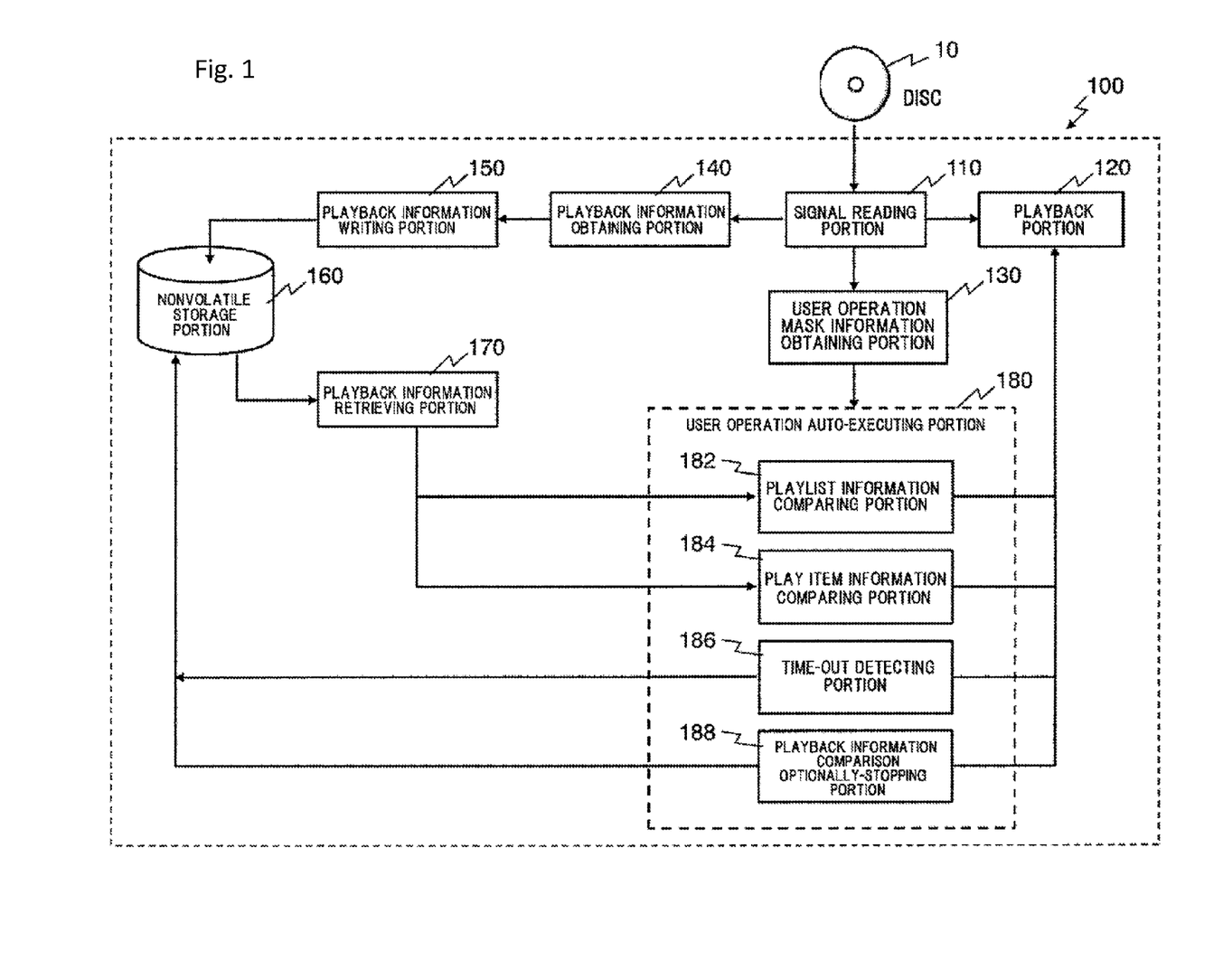
FIG. 1 is a block diagram of a disc player device according to an embodiment of the present invention.

FIG. 1 is a block diagram for illustrating an exemplary configuration of a disc player device 100 according to the present embodiment. The disc player device 100 includes a signal reading portion 110, a playback portion 120, a user operation mask information obtaining portion 130, a playback information obtaining portion 140, a playback information writing portion 150, a nonvolatile storage portion 160, a playback information retrieving portion 170, and a user operation auto-executing portion 180. The user operation auto-executing portion 180 includes a playlist information comparing portion 182, a play item information comparing portion 184, a time-out detecting portion 186, and a playback information comparison optionally-stopping portion 188.

A BD-ROM 10 is a recording medium in which AV content such as a movie and a live image is recorded.

The signal reading portion 110 reads content information recorded in the BD-ROM 10. The read content information is converted into a reproducible state by the playback portion 120 and a title is played back.

The content information read by the signal reading portion 110 is also sent to the user operation mask information obtaining portion 130. The user operation mask information obtaining portion 130 obtains user operation execution limiting information, namely, user operation mask information from the content information.

Further, the content information read by the signal reading portion 110 is also sent to the playback information obtaining portion 140. At specified intervals of time, the playback information obtaining portion 140 obtains playlist information, play item information, and playlist total playback time information which are assigned to a title being played by the playback portion 120, and delivers the obtained information to the playback information writing portion 150 as playback information. The playback information writing portion 150 stores the playback information read by the playback information obtaining portion 140 in the nonvolatile storage portion 160.

Figure 2:
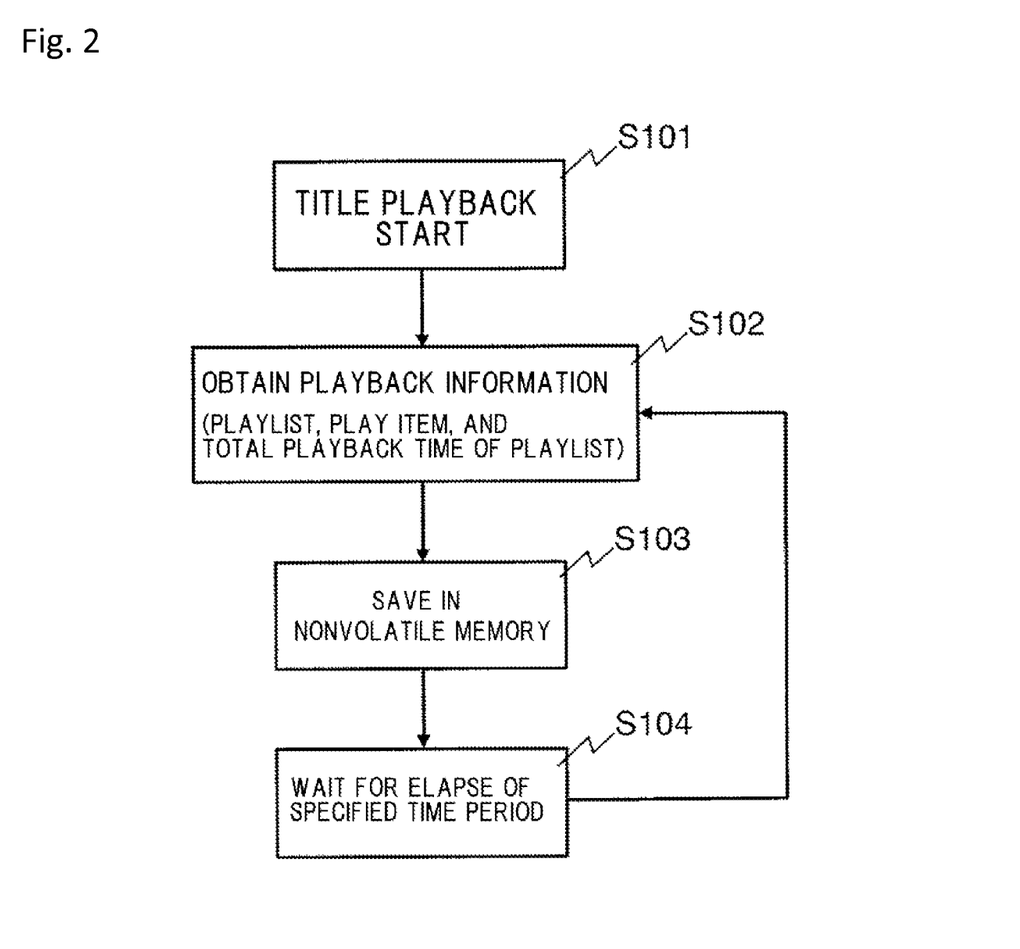
FIG. 2 is a diagram for illustrating a flow of obtaining playback information by a playback information obtaining portion included in the inventive device and writing the obtained playback information in a nonvolatile storage portion.

FIG. 2 is a diagram for illustrating a flow of obtaining playback information by the playback information obtaining portion 140 and writing the obtained playback information in the nonvolatile storage portion 160.

First, if the signal reading portion 110 reads content information recorded in the BD-ROM 10 and the playback portion 120 starts title playback on the basis of the content information (S101), then the playback information obtaining portion 140 obtains playlist information, play item information, and a playlist total playback time which are assigned to a title being played by the playback portion 120 (S102). Then, the playlist information, the play item information and the playlist total playback time are saved on the nonvolatile storage portion 160 by the playback information writing portion 150 (S103).

The playback information obtaining portion 140 waits for the elapse of a specified time period (e.g., 10 seconds), after which a process for obtaining next information is executed (S104), and after the specified time period, information is obtained again. Namely, playlist information and play item information are obtained at specified intervals of time, and playback information to be saved on the nonvolatile storage portion 160 is also updated at specified intervals of time.

While playing BD-J content, if a user on a drive stops the engine in order to, for example, take a rest, then the disc player device 100 is also powered off and consequently, the title being reproduced is interrupted. In this case, however, in the nonvolatile storage portion 160, playlist information, play item information and a playlist total playback time of the title being reproduced before the engine stops are stored as playback information.

Figure 3:
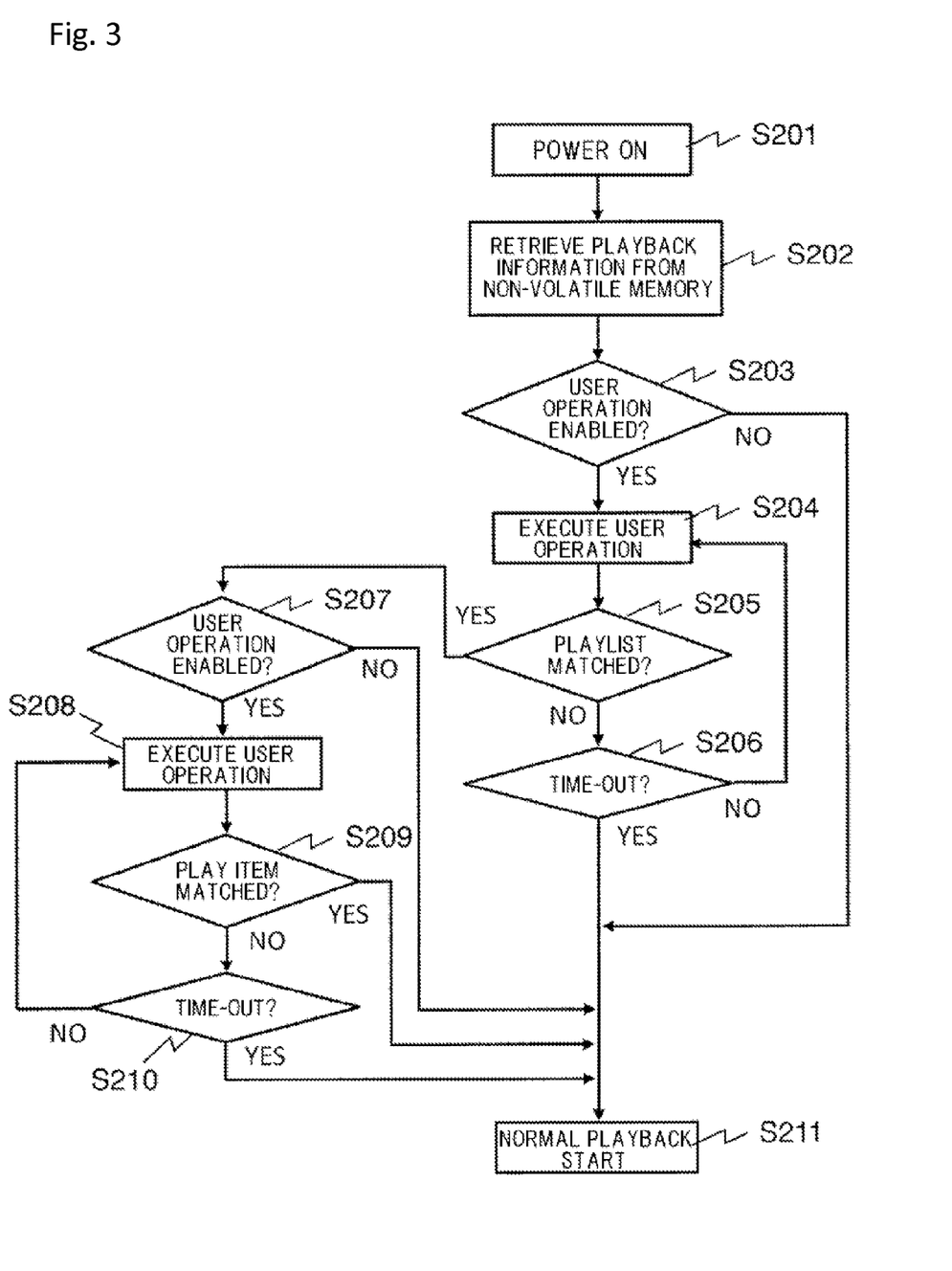
FIG. 3 is a diagram for illustrating a flow of reading playback information from the nonvolatile storage portion by a playback information reading portion included in the inventive device and processing by a user operation auto-executing portion based on the read playback information.

FIG. 3 is a diagram for illustrating a flow of reading playback information from the nonvolatile storage portion 160 by the playback information reading portion 170 and processing by the user operation auto-executing portion 180 based on the read playback information.

Figure 4:
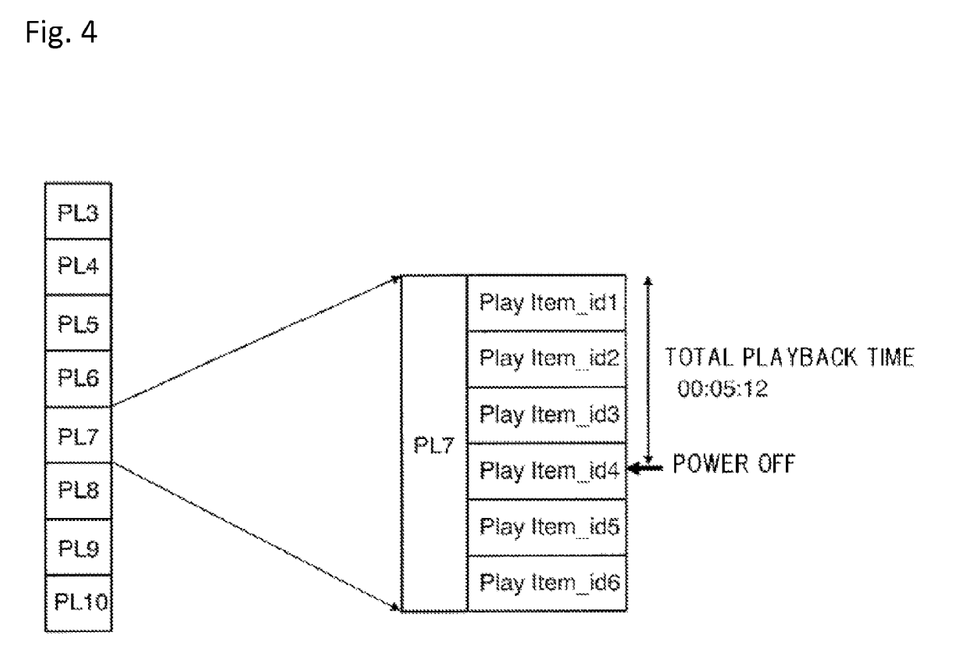
FIG. 4 is a diagram for illustrating an example of playlists and play items of AV content recorded in a BD-ROM.

FIG. 4 is a diagram for illustrating an example of playlists and play items of AV content recorded in the BD-ROM 10.

After the engine stops, if the user restarts the engine and the disc player device 100 is powered on again (S201), then the playback information stored in the nonvolatile storage portion 160 is retrieved by the playback information retrieving portion 170 and delivered to the user operation auto-executing portion 180 (S202).

The user operation auto-executing portion 180 determines whether or not user operations are executable on the basis of the user operation mask information obtained by the user operation mask information obtaining portion 130 (S203). Note that the user operations refer to operations which may be performed by the user watching packaged software, including a button operation on a menu screen, menu moving, title skipping, stopping, chapter selecting, fast-forwarding, and fast-reversing.

If the execution of the user operations is limited (S203: No), normal playback starts without particular processing executed by the user operation auto-executing portion 180 (S211). Namely, for example, similarly to conventional common disc player devices, a title being reproduced just before the power-off is not quickly searched for, and the playback is started again from the beginning in the same manner as it is when the disc is inserted.

If the execution of the user operations is not limited (S203: Yes), the user operation auto-executing portion 180 starts user operation execution processing (S204). First, the playlist information comparing portion 182 compares playlist information last stored in the nonvolatile storage portion 160 before the disc player device 100 is powered on, with playlist information on a title read by the signal reading portion 110 after the disc player device 100 is powered on (S205).

For example, as shown in FIG. 4, it is assumed that AV content of a movie is record on the BD-ROM 10, and the content is divided into playlists from "PL3" to "PL10." A scene the user was watching before the disc player device 100 is powered on is "Play Item_id4," which is play item information in "PL7," and if the device 100 is powered off at a midway of "Play Item_id4," i.e., at a playlist total playback time of 0 hr 5 min and 12 sec, then playlist information last stored in the nonvolatile storage portion 160 is "PL7," play item information is "Play Item_id4," and a total playback time is "0:5:12."

In this case, if playlist information on the title read by the signal reading portion 110 after the disc player device 100 is powered on is "PL3," since the determination in step S205 is "No," the processing returns to step S204, which is repeated until both the items of playlist information match with each other.

It should be noted that like the configuration example illustrated in FIG. 1, in order that the user operation auto-executing portion 180 has a function of monitoring a time period of the comparison process (first comparison process) executed by the playlist information comparing portion 182, the time-out detecting portion 186 may be provided which detects a time-out if the time period of the first comparison process exceeds a predetermined fixed time period (e.g., 30 seconds).

In such a configuration, if the time-out detecting portion 186 detects a time-out (S206: Yes), the comparison process being executed by the playlist information comparing portion 182 is stopped, and then normal playback of a latest title read at this process stopping by the signal reading portion 110 is started (S211).

In contrast, if the time-out detecting portion 186 does not detect a time-out (S206: No), the processing returns to step S204, which is repeated until the playlist information stored last in the nonvolatile storage portion 160 before the disc player device 100 is powered on matches with playlist information on the title read by the signal reading portion 110 after the disc player device 100 is powered on.

If "playlist matched" is determined in step S205 (S205: Yes), the processing proceeds to step S207, where the process determines again whether or not the user operations are executable on the basis of the user operation mask information obtained by the user operation mask information obtaining portion 130 (S207).

For example, if the execution of the user operations for the playlist selection is not limited (S203: Yes), but the execution of the user operations for play item selection is limited (S207: No), then the user operation auto-executing portion 180 starts the normal playback of a title for which the "playlist matched" has been recognized in step S205 (S211).

In contrast, if the execution of the user operations for the play item selection is not limited (S207: Yes), user operation execution processing is started (S208), whereby the play item information comparing portion 184 compares the playlist information last stored in the nonvolatile storage portion 160 before the disc player device 100 is powered on, with play item information on the title read by the signal reading portion 110 after the disc player device 100 is powered on (S209).

In the foregoing example, a scene the user was watching before the disc player device 100 is powered on is "Play Item_id4" in "PL7," and the play item information last stored in the nonvolatile storage portion 160 is "Play Item_id4."

In this case, if the play item information on the title read by the signal reading portion 110 is "Play Item_id1," since the determination in step S209 is "No," the processing returns to step S208, which is repeated until both the items of play item information match with each other.

It should be noted that the above-mentioned time-out detecting portion 186 may monitor a time period of the comparison process (second comparison process) executed by the play item information comparing portion 184 and detect a time-out if the time period of the second comparison process exceeds a predetermined fixed time period (e.g., 30 seconds).

In such a configuration, if the time-out detecting portion 186 detects a time-out (S210: Yes), the comparison process being executed by the play item information comparing portion 184 is stopped, and then the user operation auto-executing portion 180 starts normal playback of a latest item of the title for which the "playlist matched" has been recognized in step S205, the item being read at this process stopping by the signal reading portion 110 (S211).

In contrast, if the time-out detecting portion 186 does not detect a time-out (S210: No), the processing returns to step S208, which is repeated until the play item information last stored in the nonvolatile storage portion 160 before the power-on of the disc player device 100 matches with play item information on a title read by the signal reading portion 110 after the power-on of the disc player device 100. Finally, the title is searched up to "0:5:12," which is the playback time period of the title including the playlist information and the play item information last stored in the nonvolatile storage portion 160 before the disc player device 100 is powered on, and then the normal playback of the title is started.

If the first or second comparison process is stopped due to the time-out and the normal playback starts, it is now meaningless for the playback information stored in the nonvolatile storage portion 160 to remain therein. Thus, the time-out detecting portion 186 may have a function of erasing the playback information stored in the nonvolatile storage portion 160 if the first or second comparison process is stopped due to a time-out.

Also, like the configuration example illustrated in FIG. 1, the user operation auto-executing portion 180 may include the playback information comparison optionally-stopping portion 188 to provide a function of allowing for, in response to a user input operation, forcibly stopping the comparison processes being executed by the playlist information comparing portion 182 and the play item information comparing portion 184.

In this case, the comparison processes by the playlist information comparing portion 182 and the play item information comparing portion 184 are stopped and the normal playback starts, and it is now meaningless for the playback information stored in the nonvolatile storage portion 160 to remain therein. Thus, the playback information comparison optionally-stopping portion 188 may have a function of erasing the playback information stored in the nonvolatile storage portion 160 if the comparison processes by the playlist information comparing portion 182 and the play item information comparing portion 184 are stopped in response to a user input operation.

It should be noted that the user operation auto-executing portion 180 may include an outputting portion for, during the execution of the comparison process by the playlist information comparing portion 182 or by the play item information comparing portion 184, outputting a message indicating that the title searching is in process, thereby providing the message to the user.

Similarly, the user operation auto-executing portion 180 may include an outputting portion for, if the user operation mask information obtained by the user operation mask information obtaining portion 130 limits the execution of all the user operations, outputting a message indicating that the title searching is impossible, thereby providing the message to the user.

As described above, if the execution of the user operations is not limited by the user operation mask information, the user operation auto-executing portion 180 included in the disc player device 100 of the present invention performs title searching in response to a user's input operation until playlist information and play item information on a title being currently read by the signal reading portion 110 match with playlist information and play item information stored in the nonvolatile storage portion 160 before the power-on of the disc player device 100.

Also, it goes without saying that such title searching is performed at a speed higher than the normal speed of 1× because the searching is intended to, if the disc player device is powered off during the playing of the content of the BD-J title, and the BD-J title playing is interrupted, carry out playback resuming, when the device is powered on again, without limiting the features of the content of the BD-J title.

Since such playback resuming is performed with a Java application running unlike simple resuming carried out by changing the BD-J mode into the HDMV mode, the playback resuming can be quickly performed without limiting the features of the content.

Also, since the playback resuming is performed after a confirmation of user operation mask information, a wish of a content provider is respected. Namely, if all the user operations are prohibited, since it can be considered that the content provider hopes a user to watch the content at a normal speed of 1×, the content is reproduced at the speed of 1× without particular processing performed by the user operation auto-executing portion 180 included in the inventive device.

Further, even in the case where playback resuming by a Java program acts, since playlist information and play item information on a title started by the playback resuming are confirmed, a skipping process is never erroneously executed. Thus, the resuming function of the disc player device of the present invention can coexist with a resuming function of a Java program.

INDUSTRIAL APPLICABILITY

According to the present invention, it is allowed to provide a disc player device for, if the disc player device is powered off while content of a BD-J title is being played, and the playback of the BD-J title is stopped, performing playback resuming quickly when the device is powered on again, without limiting features of the content of the BD-J title.

REFERENCE SIGNS LIST

100 disc player device
110 signal reading portion
120 playback portion
130 user operation mask information obtaining portion 140 playback information obtaining portion
150 playback information writing portion
160 nonvolatile storage portion
170 playback information retrieving portion
180 user operation auto-executing portion
182 playlist information comparing portion
184 play item information comparing portion
186 time-out detecting portion
188 playback information comparison optionally-stopping portion

The invention claimed is:

1. A disc player device comprising:
a signal reading portion that reads content information recorded in a disc;
a playback portion that plays a title on the basis of the read content information;
a user operation mask information obtaining portion that obtains user operation mask information from the content information;
a playback information obtaining portion that obtains playlist information, play item information, and playlist total playback time information as playback information, which are assigned to a title being played by the playback portion;
a nonvolatile storage portion in which the playback information is stored;
a playback information writing portion that stores, in the nonvolatile storage portion, the playback information read by the playback information obtaining portion;
a playback information retrieving portion that retrieves the playback information from the nonvolatile storage portion; and
a user operation auto-executing portion that executes a user operation not being limited by the user operation mask information obtained by the user operation mask information obtaining portion,
wherein the user operation auto-executing portion includes:
a playlist information comparing portion that compares the playlist information last stored in the nonvolatile storage portion before the disc player device is powered on, with playlist information on a title read by the signal reading portion after the disc player device is powered on; and
a play item information comparing portion that, after the comparison process for the playlist information, compares the play item information last stored in the nonvolatile storage portion before the disc player device is powered on, with play item information on the title read by the signal reading portion after the disc player device is powered on, and
wherein if there is one or more user operations, execution of which is not limited by the user operation mask information, the comparison process for the playlist information and the comparison process for the play item information automatically execute the user operation not being limited by the user operation mask information and provide title searching at a speed higher than a normal speed of 1× until playlist information and play item information on a title currently being read by the signal reading portion match with the playlist information and the play item information stored in the nonvolatile storage portion before the disc player device is powered on.

2. The disc player device according to claim 1, wherein
the user operation auto-executing portion includes a time-out detecting portion that monitors a time period of a first comparison process executed by the playlist information comparing portion and a time period of a second comparison process executed by the play item information comparing portion, and detects a time-out if the time period of the first comparison process exceeds one fixed time period predetermined therefor or the time period of the second comparison process exceeds another fixed time period predetermined therefor, and
the time-out detecting portion stops a comparison process of the playlist information comparing portion or the play item information comparing portion, in which the time-out is detected, and causes the playback portion to play a title to which playlist information and play item information to be compared at the time of the comparison process being stopped are assigned.

3. The disc player device according to claim 2, wherein the time-out detecting portion has a function of, if the comparison process is stopped due to the time-out, erasing the playback information stored in the nonvolatile storage portion.

4. The disc player device according to claim 1, wherein the user operation auto-executing portion further includes a playback information comparison optionally-stopping portion that forcibly stops comparison processes being executed by the playlist information comparing portion and the play item information comparing portion, in response to a user input operation.

5. The disc player device according to claim 4, wherein the playback information comparison optionally-stopping portion has a function of, if the information comparison processes are stopped in response to the user input operation, erasing the playback information stored in the nonvolatile storage portion.

6. The disc player device according to claim 1, wherein the user operation auto-executing portion further includes an outputting portion for, during the execution of the comparison process by the playlist information comparing portion or by the play item information comparing portion, outputting a message indicating that title searching is in process.

7. The disc player device according to claim 1, wherein the user operation auto-executing portion further includes an outputting portion for, if the user operation mask information obtained by the user operation mask information obtaining portion limits execution of all user operations, outputting a message indicating that title searching is impossible.

* * * * *